(12) United States Patent
Boutaghou et al.

(10) Patent No.: US 6,377,422 B1
(45) Date of Patent: Apr. 23, 2002

(54) DISC HEAD WITH CONTACT PROTECTION FEATURE

(75) Inventors: Zine-Eddine Boutaghou, Vadnais Heights; He Huang, Eden Prairie, both of MN (US); Merle E. Thowe, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/097,968

(22) Filed: Jun. 16, 1998

Related U.S. Application Data

(60) Provisional application No. 60/051,961, filed on Jul. 8, 1997.

(51) Int. Cl.$^7$ .............................................. G11B 5/60
(52) U.S. Cl. ...................................................... 360/103
(58) Field of Search .......................................... 360/103

(56) References Cited

U.S. PATENT DOCUMENTS

| | | | |
|---|---|---|---|
| 5,067,037 A | 11/1991 | Ananth et al. | 360/103 |
| 5,200,867 A | 4/1993 | Albrecht et al. | 360/103 |
| 5,202,803 A | 4/1993 | Albrecht et al. | 360/97.02 |
| 5,267,104 A | 11/1993 | Albrecht et al. | 360/97.02 |
| 5,345,353 A | 9/1994 | Krantz et al. | 360/103 |
| 5,418,667 A | 5/1995 | Best et al. | 360/103 |
| 5,424,888 A | 6/1995 | Hendriks et al. | 360/103 |
| 5,499,149 A | 3/1996 | Dovek | 360/103 |
| 5,537,273 A | 7/1996 | Hendriks et al. | 360/103 |
| 5,550,691 A | 8/1996 | Hamilton | 360/103 |
| 5,550,693 A | 8/1996 | Hendriks et al. | 360/103 |
| 5,572,386 A | 11/1996 | Ananth et al. | 360/103 |
| 5,625,512 A | 4/1997 | Smith | 360/103 |
| 5,841,608 A | 11/1998 | Kasamatsu et al. | 360/103 |
| 5,898,542 A * | 4/1999 | Koshikawa | 360/103 |

FOREIGN PATENT DOCUMENTS

| | | |
|---|---|---|
| JP | 8-69674 | 3/1996 |
| JP | 8-212740 | 8/1996 |
| JP | 8-287440 | 11/1996 |

\* cited by examiner

*Primary Examiner*—A. J. Heinz
(74) *Attorney, Agent, or Firm*—Westman, Champlin & Kelly, P.A.

(57) ABSTRACT

An improved disc head for increased wear protection. The disc head includes wear members 74, 76, 92, 94, formed proximate to transducer elements of a thin film head. The wear members 74, 76, 92, 94 are formed along a portion of a lower surface of the head facing the disc surface and are formed of a relatively hard material for increasing wear resistance of the head, proximate to the transducer elements 70.

21 Claims, 9 Drawing Sheets

DISC HEAD WITH CONTACT PROTECTION FEATURE

CROSS-REFERENCE TO RELATED APPLICATION

The invention claims priority to Provisional Application Ser. No. 60/051,961, filed Jul. 8, 1997, and entitled "HEAD BUMP FOR THERMAL ASPERITY REDUCTION".

FIELD OF THE INVENTION

The present invention relates to a disc drive system where data is stored on discs for selective access via a disc head. In particular, the present invention relates to an improved disc head design for supporting transducer elements relative to a disc surface for operation of a disc drive.

BACKGROUND OF THE INVENTION

Disc drive systems are known which include disc heads which are supported relative to a disc surface to fly above a disc surface for operation of transducer elements. In particular, the disc heads include a slider which includes an air bearing surface ("ABS"). The slider is supported so that the air bearing surface faces the disc surface during operation. Typically, an air bearing surface includes raised rail and recessed surfaces which define a hydrodynamic air bearing surface, which provides lifting force in cooperation with the rotation of the disc below the air bearing surface.

The slider includes a leading edge and a trailing edge. The slider is oriented relative to the rotation of the disc so that air flows via rotation of the disc from the leading edge to the trailing edge of the air bearing surface to lift the leading edge of the slider. The slider flies at a pitch angle where the leading edge of the slider is elevated above the trailing edge of the slider in a known manner. Transducers are supported relative to the trailing edge of the slider for read and write operations.

Known transducers include inductive-type transducers and magnetoresistive-type transducers. Such transducers are fabricated on the leading edge of the slider by known film deposition techniques. In particular, the slider includes a substrate layer. The substrate is typically formed of a mixture of ceramic compounds, such as $Al_2O_3$ ("Alumina") and TiC ("Titanium Carbide"); and the transducer elements are typically embedded within an Alumina layer, which is deposited on the slider substrate in a known manner to form a thin film head.

Typically, a disc includes a landing zone and a data zone. Data is stored in the data zone and not in the landing zone. Prior to operation of the disc drive, the slider rests on the landing zone. During operation of the disc drive, the slider takes off and lands on the landing zone of the disc surface for contact starts and stops ("CSS"). The slider flies at an angle so that the trailing edge supporting the transducer elements is located proximate to the disc surface.

Additionally, during operation, shock may force the head to contact or slap the disc surface; or, alternatively, the contour of the disc surface may be uneven such that the slider contacts asperities in the disc surface. Due to the fly pitch angle of the slider, the slider tends to contact the disc surface proximate to the trailing edge where the transducers are located. Sliders are being designed to fly at lower fly heights, thereby increasing the propensity of head contact with the disc surface. Continued contact of the head with the disc surface over time wears down the Alumina layer of the thin film head, which may damage transducers and lead to failure of the disc drive. In an MR head, contact between the head and disc surface may heat the MR elements causing a large spike in the output of the MR element, which disrupts its ability to read data from the disc surface. This is known as a thermal asperity. Thus, it is desirable to reduce wear due to head contact with the disc surface to reduce the effect of thermal asperities and damage to the transducer elements. The present invention provides a solution to this and other problems, and offers other advantages over the prior art.

SUMMARY OF THE INVENTION

The present invention relates to an improved disc head for increased protection for the transducer elements and reduction of thermal asperities. The disc head includes deposited members formed proximate to transducer elements at a contact interface between the head and disc surface. Preferably, the wear members are formed of a diamond-like carbon. These and various other features as well as advantages which characterize the present invention will be apparent upon reading of the following detailed description and review of the associated drawings.

BRIEF DESCRIPTION OF THE DRAWINGS

FIG. 3-1 is an illustrative side view of a trailing edge portion of a disc head incorporating an embodiment of a wear member of the present invention.

FIG. 3-2 is a side view, similar to FIG. 3-1, illustrating an alternate embodiment of a wear member of the present invention.

FIG. 7-1 is an illustrative side view of a trailing edge portion of a disc head incorporating an embodiment of a wear member of the present invention.

FIG. 7-2 is a side view, similar to FIG. 7-1, illustrating an alternate embodiment of a wear member of the present invention.

The drawings are not necessarily drawn to scale and are for included illustration.

DETAILED DESCRIPTION OF THE PREFERRED EMBODIMENTS

Figure 1:
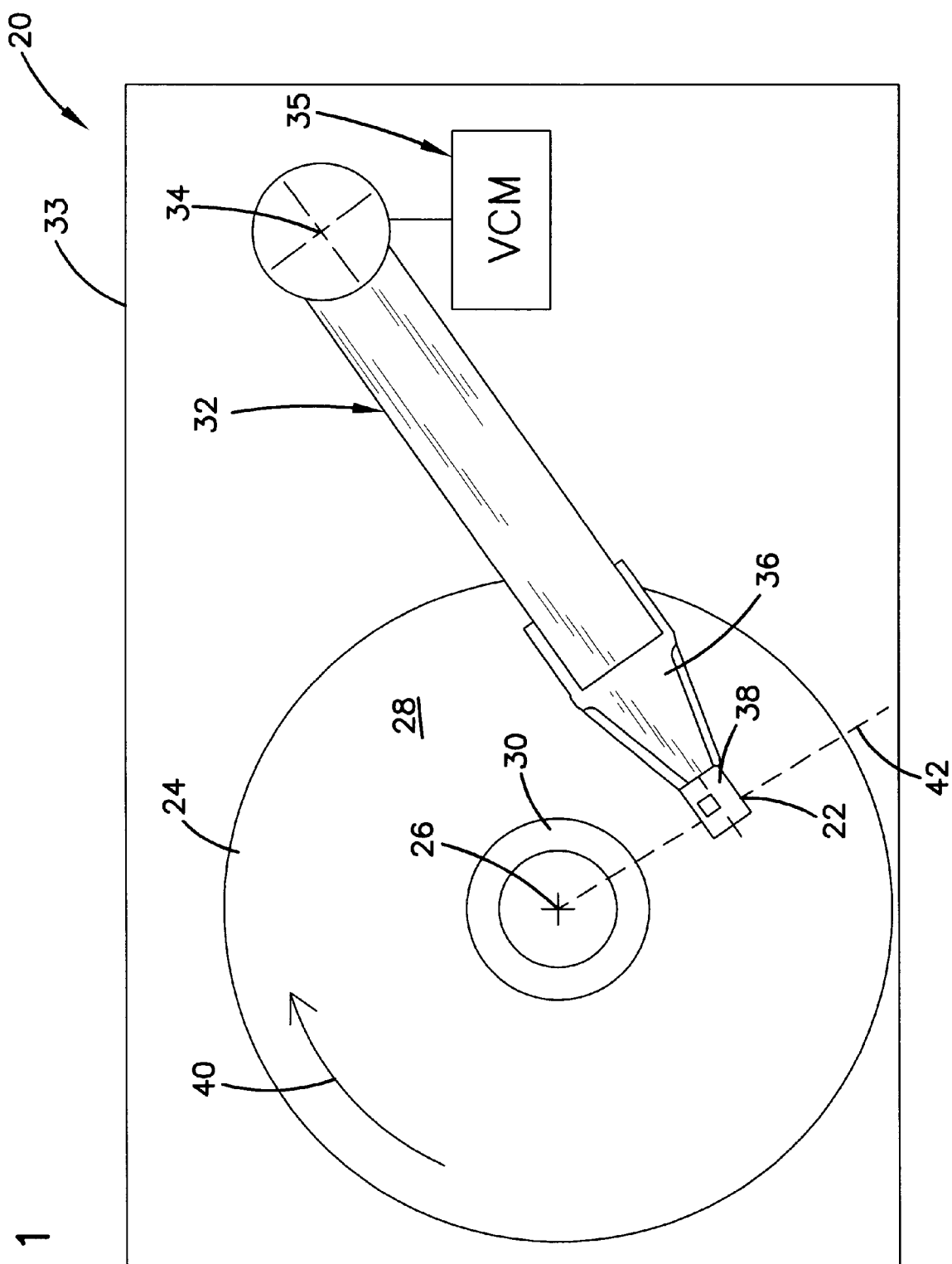
FIG. 1 is a diagrammatic view of a disc head drive.

FIG. 1 is a schematic view of a disc drive or data storage system 20 where a disc head 22 is supported relative to a surface of a disc 24 to read and write data to the disc surface. Discs are supported for rotation about axis 26 in a known manner. The disc 24 includes a data zone 28 and a landing zone 30. Data is stored in the data zone 28 and is retrieved by the disc head 22 as head 22 flies above the disc surface in a known manner. During periods of nonoperation, the disc head 22 rests in the landing zone 30 and takes off from and lands on the landing zone 30 for contact starts and stops ("CSS").

As shown, disc head 22 is supported via actuator assembly 32 operably coupled to housing 33 of the disc drive 20. Disc 24 is also coupled to housing 33 of the disc drive. The actuator assembly 32 is a rotary-type actuator assembly, although other actuator assemblies are known. The rotary-type actuator assembly operates about a pivot axis 34 in a known manner via a voice coil motor 35 (shown schematically). The disc head 22 is operably coupled to the actuator assembly 32 via a suspension assembly 36. Typically, the disc head 22 includes a slider 38, which is operably coupled to the suspension assembly 36. During operation, disc 24 is rotated about axis 26, as illustrated by arrow 40, to raise head 22 to fly above the disc surface. The actuator assembly 22 rotates about pivot axis 34 to move disc head 22 along an arcuate path, as illustrated by line 42.

Figure 2:
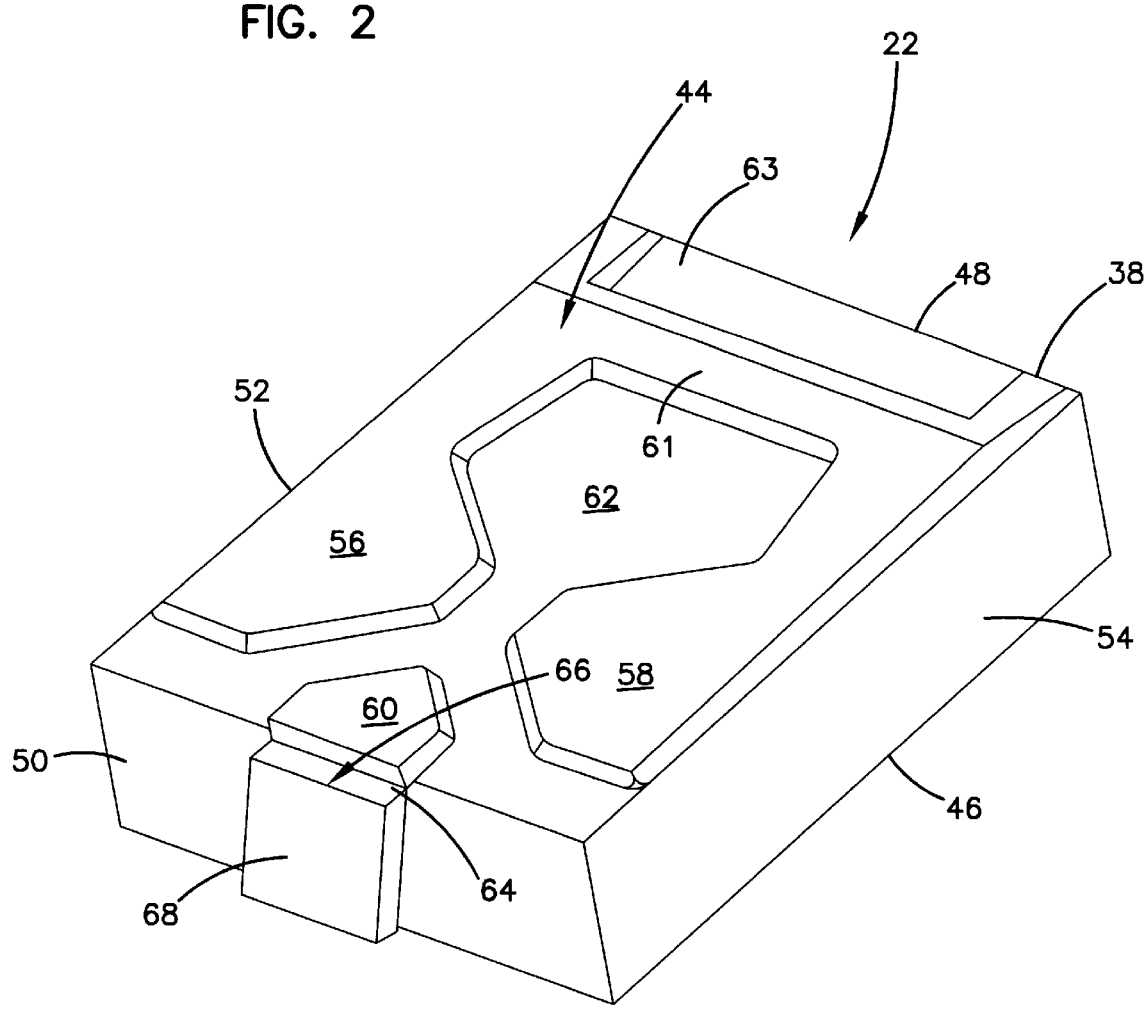
FIG. 2 is a perspective view of a disc head including a slider of a head for supporting transducers relative to the disc surface.

Disc head 22 includes slider 38, as illustrated in FIG. 2. It should be understood that sliders may be formed of any number of designs and that the invention is not limited to the particular design shown. As shown, slider 38 includes an air bearing surface ("ABS") 44, a suspension surface 46, leading end 48, trailing end 50, and opposed sides 52, 54. The slider 38 is coupled to the suspension assembly 36 at the suspension surface 46 so the ABS 44 faces the disc surface. The slider 38 is aligned so that rotation of the disc causes air to flow from the leading edge 48 to the trailing edge 50. The ABS 44 in the embodiment of the slider 38 shown includes opposed raised side rails 56, 58 and center rail 60. The opposed raised side rails 56, 58 and center rail 60 define the air bearing surface to lift the slider 22 to fly above the disc surface. The slider 22 includes a dam 61 to form subambient pressure cavity 62 to control fly height in a known manner and a stepped leading surface 63 for "take-off".

The slider 38 is formed of a ceramic substrate material, such as a mixture of TiC and Alumina, or other known slider materials. Transducers elements 64 (shown schematically) are embedded or encapsulated in a material layer on the trailing edge 50 of the slider substrate to form the transducer or thin film head 66. Preferably, the transducer elements 64 are embedded or encapsulated in an Alumina material and are deposited on the trailing edge 50 by known thin film deposit techniques. Transducer elements 64 may be inductive-type transducers or magnetoresistive transducers. The slider 38 takes off and lands on the landing zone 30 to fly above the data zone 28 for operation. The slider flies at a pitch angle where the leading edge 48 of the slider flies at a higher height than the trailing edge 50 of the slider so that the transducer elements 64 are positioned proximate to the disc surface for read and write operations.

Figures 1, 3:
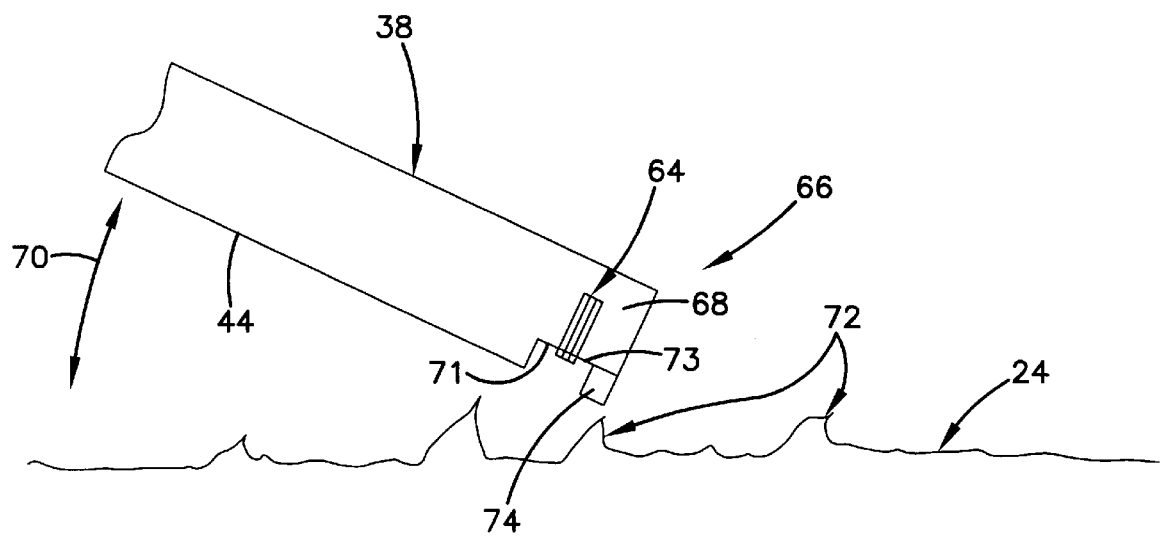
Figures 2, 3:
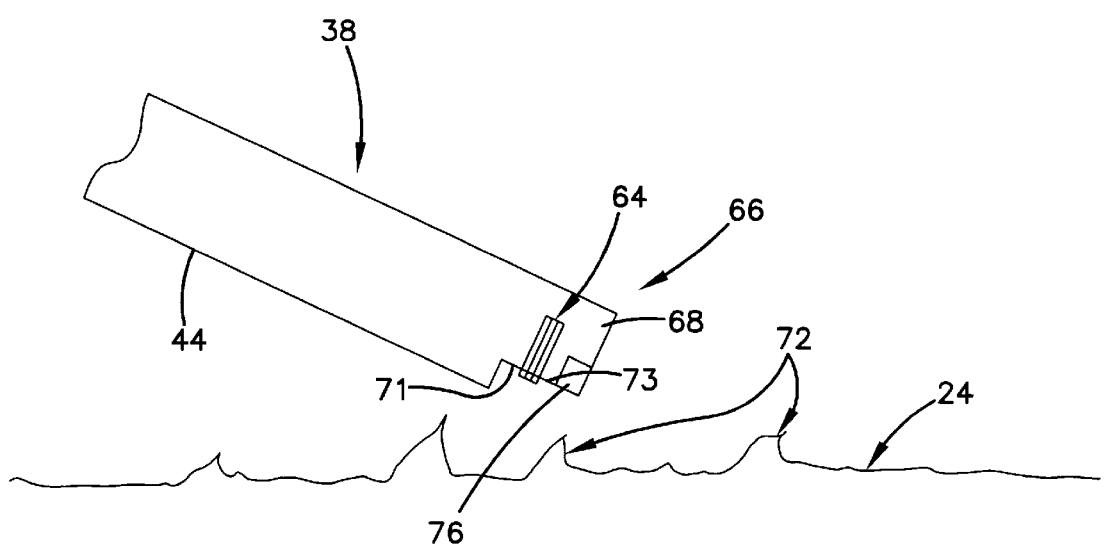

FIGS. 3-1 and 3-2 are enlarged side illustrations of a trailing edge portion of the slider 38 flying above the disc surface at a pitch angle 70 (where the trailing edge 50 is flying closer to the disc surface 54 than the leading edge 48). The ABS 44 of the slider faces the disc surface. Transducer elements 64 are typically recessed from the ABS 44 (bearing surfaces 56, 58 and 60). As shown, thin film head 66 is formed relative to a trailing edge 50 of the slider and includes a protective layer 68 co-aligned with the trailing edge 50. Typically, the protective layer 68 is formed of an Alumina material. Transducer elements 64 include elements 70 for read/write operations (i.e. poles of inductive-type transducers) on an operating surface 71 of the thin film head 64 aligned relative to the ABS 44 to face the disc surface.

As illustrated in FIGS. 3-1 and FIG. 3-2, disc surfaces generally have roughened surface structures defining various bumps 72. During operation, the disc head 22 may contact bumps 72 or may contact the disc surface 54 during head slap due to vibration or shock. Since the head 22 flies at a pitch angle 70 with the trailing edge flying closer to the disc surface than the leading edge, the leading edge may contact the disc surface during head slap or may contact bumps 72.

Contact between the disc surface and the transducer may wear the encapsulating material or protective layer 68 exposing the transducer elements 64 to damage. Contact between the and MR transducer element and disc surface may cause thermal asperities degrading performance of the disc drive.

To provide wear resistance at the contact position, a lower surface 73 of the protective layer 68 may include a wear member 74 to provide enhanced wear resistance. As shown in the embodiment of FIG. 3-1, wear member 74 extends from the protective layer 68 below or beyond the operating surface 71 of the transducer elements 64. The wear member 74 is formed of a relatively hard material, such as a diamond-like carbon, to provide enhanced wear resistance. Preferably, the extended thickness of the wear member 72 is 0.3 $\mu$inches (7.62 nanometers). Alternatively, wear member 74 may be formed of materials such as TiC or $Si_3N_4$. Wear member 74 is formed on thin film head 66 by known deposit techniques.

Figure 4:
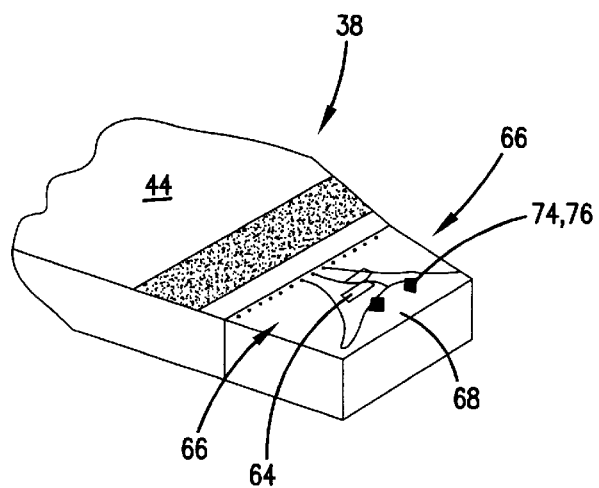
FIG. 4 is a perspective view of a trailing edge portion of a disc head incorporating an embodiment of wear members of the present invention.

FIG. 3-2 illustrates an alternate embodiment of a disc head including wear member 76, which is embedded in the lower surface 73 of the protective layer 68 during formation of the thin film head 66. Wear member 76 is embedded so that the exposed surface of the wear member 76 is flush with operating surface 71. Wear member 76 may be formed of a diamond-like carbon material, or, alternatively, may be formed of TiC or $Si_3N_4$. Preferably, the embedded thickness of the wear member 76 is 0.3 $\mu$inches (7.62 nanometers). Thus, wear members 74, 76 are located in front of transducer elements 64 to provide increased wear resistance for the Alumina of protective layer 68. As shown in FIG. 4, contact of the slider with the disc surface causes the Alumina of the thin film head 66 to heat and expand. Wear members 74, 76 expand therewith to provide increased wear resistance for the material of the thin film head 66 and transducer elements 64.

Figures 5, 6:
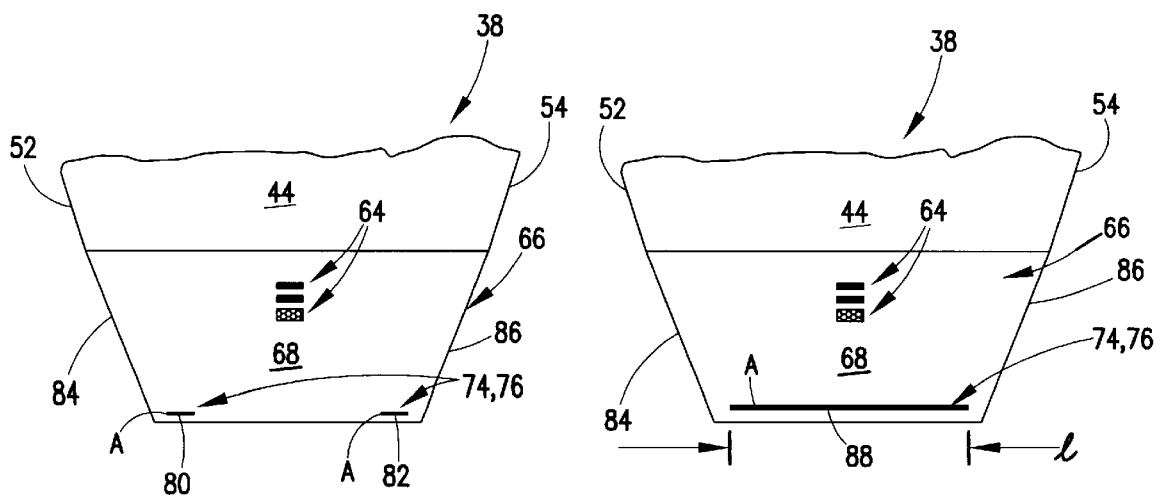
FIG. 5 is a plan view of a trailing edge portion of a lower surface of the head illustrating transducer elements and an embodiment of wear members of the present invention.
FIG. 6 is a plan view of a trailing edge portion of a lower surface of the head illustrating transducer elements and an embodiment of wear members of the present invention.

FIGS. 5–6 illustrate alternate embodiments for the wear members 74, 76 of FIGS. 3-1 and 3-2. As shown in FIG. 5, wear members 74, 76 may include spaced transverse pads 80, 82. Spaced pads 80, 82 are formed relative to the lower surface 73 of the protective layer 68 on opposed sides of transducer elements 70, aligned with opposed sides 52, 54 of slider 38. The pads 80, 82 are spaced a sufficient distance from the sides of the transducer elements 70 to provide adequate wear protection for the transducer elements 70 therebetween. Preferably, pads 80, 82 are located proximate to opposed sides 84, 86 of the thin film head 64.

As shown in FIG. 6, wear members 74, 76 may be formed of an elongated traverse bar 88, having an elongated extent aligned between opposed sides 84, 86 of head 64. Opposed ends of the bar 88 preferably, extend to opposed sides 84, 86 of the thin film head 64, although ends of bar 88 may be spaced from sides 84, 86 as long as there is sufficient length to protect transducer elements 70. Bar 88 of wear member 74 extends from the lower surface 73 of protective layer 68 to provide wear protection, and bar 88 of wear member 76 is embedded into the lower surface 73 of protective layer 68.

Figures 1, 7:
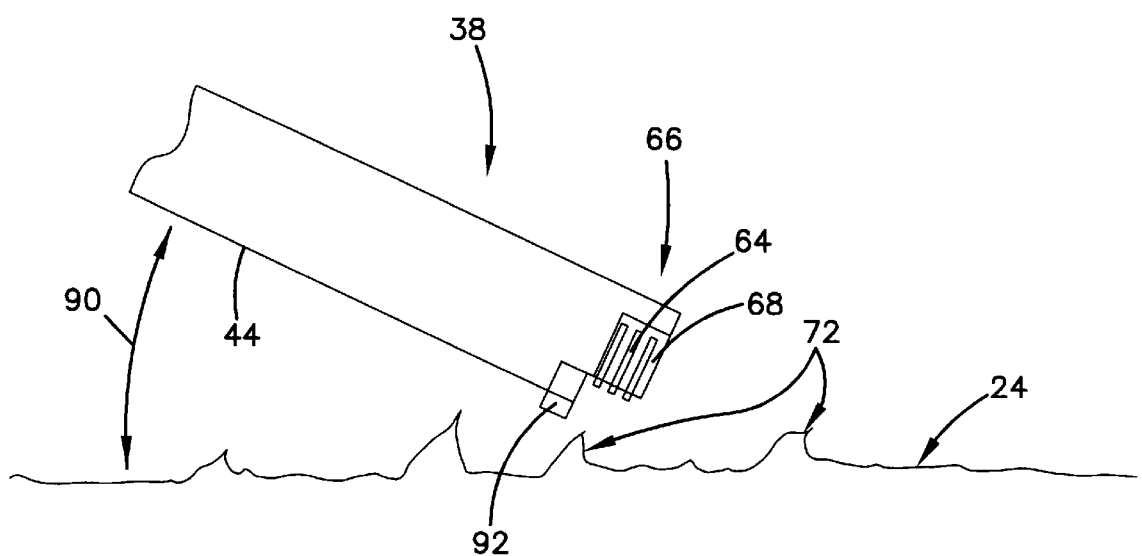
Figures 2, 7:
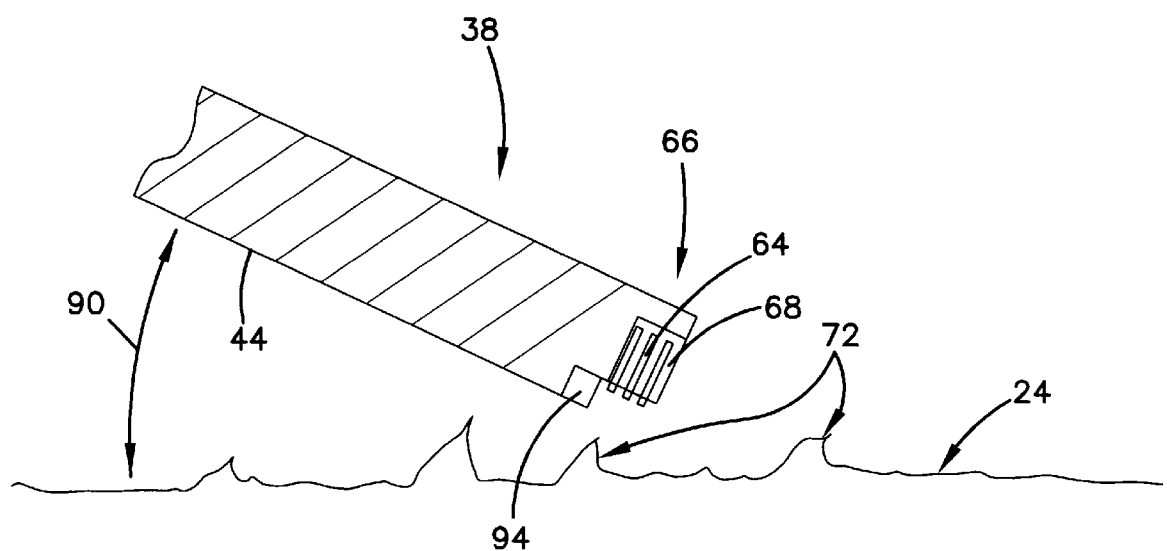

FIGS. 7-1 and 7-2 illustrate slider 38 flying at an alternate pitch angle 90 so that the contact position between the disc head and disc surface shifts rearwardly of or behind the transducer elements 70 toward the leading edge 48 of the slider 38. To protect transducer elements 70 from damage, wear member 92, shown in FIG. 7-1, may be included. Wear member 92 extends from the ABS 44 of slider 38 to protect the thin film head 64. Wear member 92 is preferably formed of a diamond-like coating and has an extended thickness of 0.3 μinches (7.62 nanometers). Wear member 92 may be coupled to the ABS 44 via an adhesive layer in a known manner.

Alternatively, as shown in FIG. 7-1, wear member 94 is embedded into the ABS 44 of the slider, proximate to the transducer elements 70, by known manufacturing techniques. Wear member 94 is embedded so that an exposed surface of wear member 94 is flush with ABS 44. Preferably, wear member 94 is formed of a diamond-like coating or other hard material for wear resistance and has a thickness of at least 0.3 μinches (7.62 nanometers). Thus, wear members 92, 94 provide increased wear protection behind the transducer elements 70 toward the leading edge 48 of the slider 38.

Figure 8:
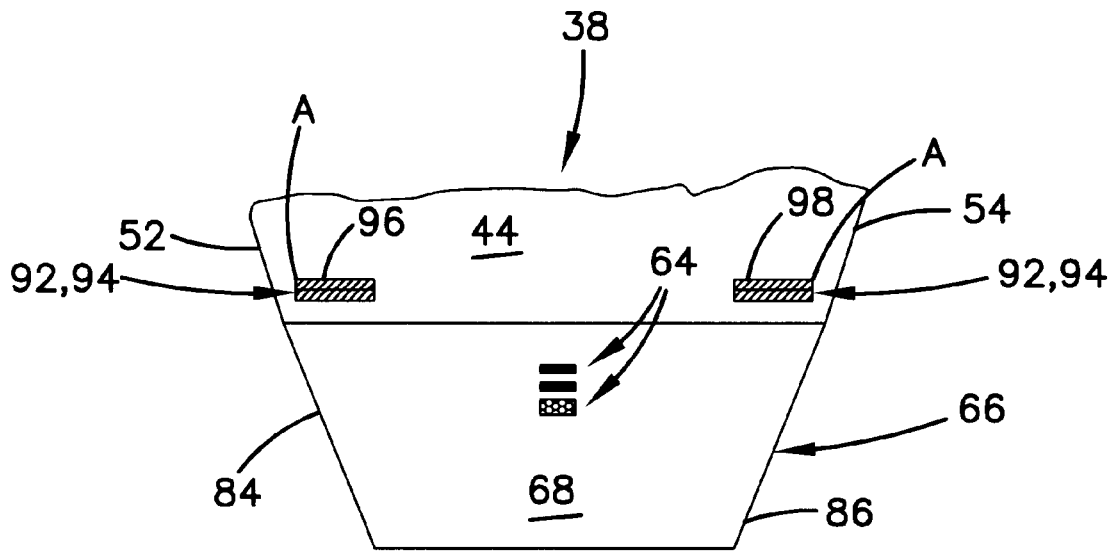
FIG. 8 is a plan view of a trailing edge portion of a lower surface of a head illustrating transducer elements and an embodiment of wear members of the present invention.
Figure 9:
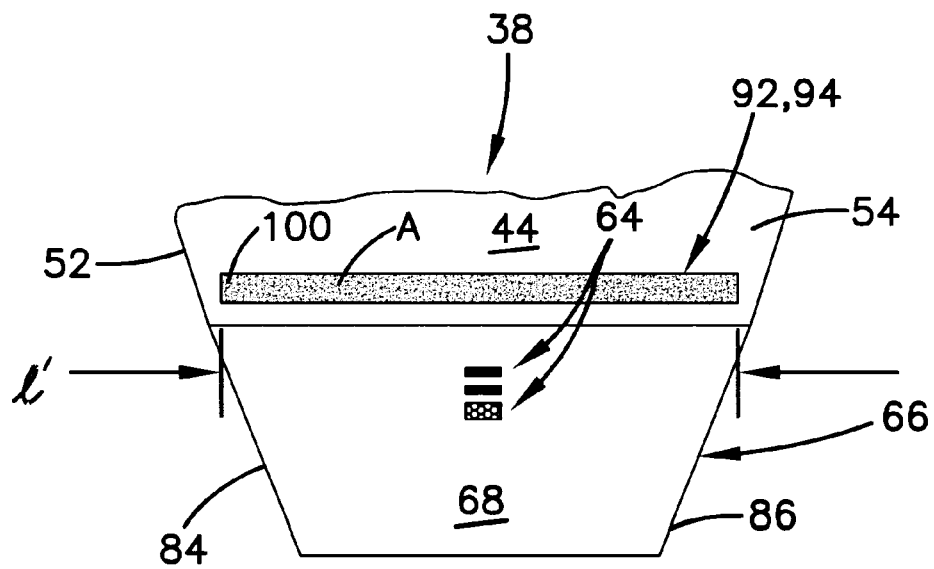
FIG. 9 is a plan view of a trailing edge portion of a lower surface of a head illustrating transducer elements and an embodiment of wear members of the present invention.

FIGS. 8–9 illustrate alternate embodiments of wear members 92, 94. As shown in FIG. 8, wear members 92, 94 may include spaced transverse pads 96, 98. Spaced pads 96, 98 of wear members 92, 94 are formed relative to ABS 44 of slider 38 on opposed sides of transducer elements 70, aligned with opposed sides 52, 54 of slider 38. The pads 96, 98 are spaced a sufficient distance from the sides of the transducer elements 70 to provide adequate wear protection for the transducer elements 70 therebetween. In particular, pads 96, 98 of wear member 92 extend from the ABS 44 and pads 96, 98 of wear member 94 are embedded into the ABS 44. As shown in FIG. 9, wear members 92, 94 may be formed of an elongated traverse bar 100, which extends between sides of transducer elements 70, preferably to sides 52, 54 of the slider 38. In particular, bar 100 of wear member 92 extends from the ABS 44 to provide wear protection, and bar 100 of wear member 94 is embedded into the ABS 44.

Figure 10:
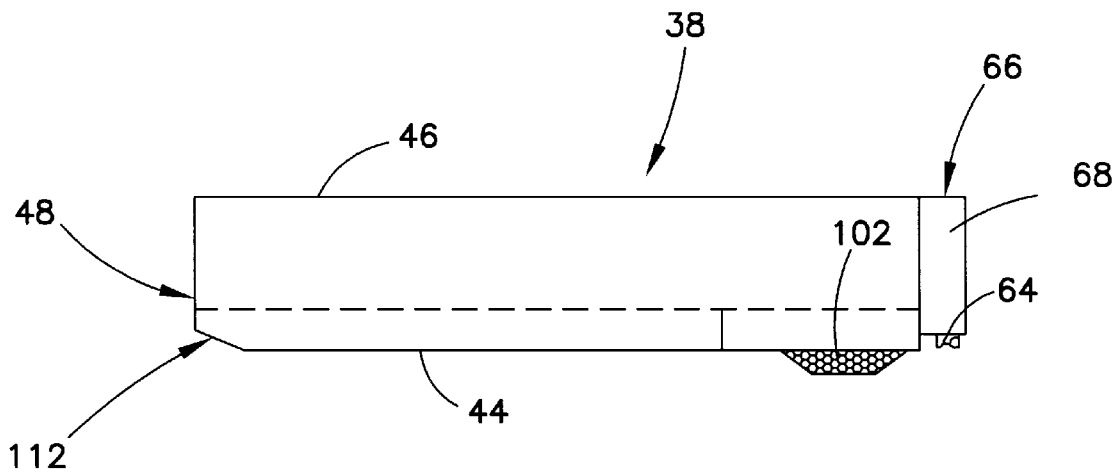
FIG. 10 is a side view of a disc head incorporating an alternate embodiment of a wear member.
Figure 11:
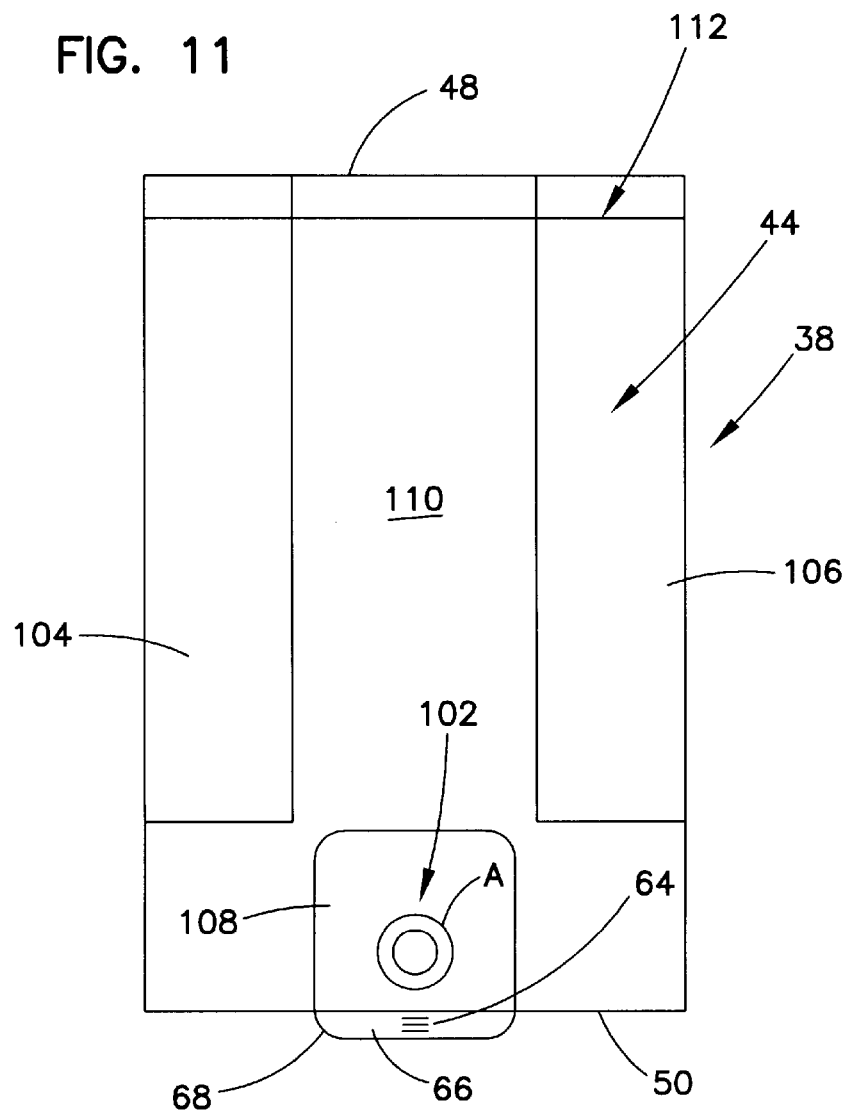
FIG. 11 is a plan view of the ABS surface of the head of FIG. 10 illustrating the embodiment of the wear member of FIG. 10.

FIGS. 10 and 11 illustrate an alternate embodiment of a wear member 92 formed on the lower surface of the head. As shown in FIGS. 10 and 11, wear member 92 is formed of a frusto-conical-shaped extension 102, which extends from the ABS 44, below the transducer elements 70, to protect the transducer elements 70 during head slap. The frusto-conical shape defines an extension which is tapered between the lower surface of the head and an extended portion of extension 102.

Extension 102 is illustrated in FIG. 11 in relation to an alternately designed ABS 44, which includes opposed side rails 104, 106 and center platform 108. Recessed surface 110 is formed between side rails 104, 106 and center platform 108 to define a subambient pressure cavity. Thus, side rails 104, 106, center platform 108, and recessed surface 110 define ABS 44. Leading end 48 of ABS 44 includes a tapered edge 112, as is known. Preferably, extension 102 extends from an exposed lower surface of center platform 108. Preferably, extension 102 is formed of a diamond-like carbon and extends 0.00394 μinches–0.00788 μinches (0.1–0.2 nanometers) from center platform 108. The diameter of the extension 102 is sufficient so that the transverse width of the extension 102 extends to opposed sides of the transducer elements 70. The diameter of the extension 102 may be sized larger than the width of the transducer elements 70 for desired wear protection.

Thus, as described, the wear members provide more significant wear protection over known slider coatings without increasing the weight and altering the fly characteristics of the slider 38. In particular, wear members of the present invention have sufficient thickness to provide material for wear resistance without affecting the weight and fly characteristics of the slider.

It is to be understood that, even though numerous characteristics and advantages of the various embodiments of the present invention have been set forth in the foregoing description together with details of the structure and functions of various embodiments of the invention, this disclosure is illustrative only; and changes may be made in detail, especially in the matters of structure and arrangement of parts within the principles of the present invention to the fullest extent indicated by the broad general meaning of the terms in which the pending claims are expressed. For example, the particular elements may vary, depending upon the particular application, while maintaining substantially the same functionality without departing from the scope and spirit of the present invention.

Thus, as described, improved disc heads of the present invention include wear members 74, 76, 92, 94 which increase wear resistance of the Alumina substrate proximate to the transducer elements 70 to reduce failure of the disc drive. The wear members 74, 76, 92, 94 are preferably formed of a diamond-like carbon, proximate to transducer elements 70 for protecting the transducer elements 70.

What is claimed is:

1. A disc head comprising:
    a slider having a leading end, a trailing end, and an air bearing surface;
    a transducer on the trailing end of the slider including a trandsducer element and a trailing edge protective layer, said transducer element being aligned relative to the air bearing surface to define an operating surface of the transducer, and the protective layer having a lower surface aligned with the operating surface of the transducer; and
    a wear member formed of a harder material than the protective layer along a portion of the lower surface of the protective layer to increase wear resistance of the protective layer at a contact interface between the disc head and the disc.

2. The disc head of claim 1 wherein the wear member is formed of an elongated member having first and second ends, said first and second ends extending to opposed sides of the transducer element.

3. The disc head of claim 2 wherein the extent of the elongated member extends generally between transverse opposed sides of the transducer.

4. The disc head of claim 1 wherein the wear member is formed of a $Si_3N_4$ material.

5. The disc head of claim 1 wherein the member is embedded into the protective layer so that a surface of the wear member is flush with the lower surface of the protective layer.

6. The disc head of claim 1 wherein the wear member protrudes from the lower surface of the protective layer.

7. The disc head of claim 1 wherein the protective layer is formed of Alumina and the wear member is formed of a diamond-like carbon material.

8. The disc head of claim 1 wherein the wear member has a thickness of at least 0.3 µinches (7.62 nanometers).

9. The disc head of claim 1 wherein the disc head includes a plurality of spaced wear members formed on the protective layer over a trailing edge surface of the transducer.

10. The disc head of claim 9 wherein the wear members are formed of wear pads spaced along a portion of the lower surface of the protective layer on opposed sides of the transducer.

11. The disc head of claim 9 wherein first and second wear members are positioned on opposed sides of the transducer element.

12. The disc head of claim 1 wherein the wear member is formed of a TiC material.

13. A disc head comprising:
   a slider having a leading end, a trailing end, and an air bearing surface defining a portion of a lower surface of the slider;
   a transducer on the trailing end of the slider including a transducer element and a protective layer formed over a trailing edge surface of the transducer, a lower surface of the transducer being recessed from the lower surface of the slider; and
   a wear member formed of a harder material than the slider embedded at the trailing end of the slider so that a surface of the wear member is flush with the lower surface of the slider for protecting the transducer element.

14. The disc head of claim 13 wherein the wear member includes a plurality of embedded wear pads spaced along a width of the transducer.

15. The disc head of claim 13 wherein the embedded wear member is formed of an elongated member having first and second ends, said first and second ends generally extending between opposed sides of the transducer.

16. The disc head of claim 13 wherein the wear member has a thickness of at least 0.3 µ inches.

17. The disc head of claim 13 wherein the wear member is rectangular shaped.

18. The disc head of claim 13 wherein the wear member is formed of a diamond-like carbon.

19. A disc drive comprising:
   a housing;
   at least one data storage disc rotationally supported relative to the housing;
   an apparatus to rotate the at least one data storage disc; disc;
   a head including:
      a slider having a leading end, a trailing end, opposed side rails and a center rail;
      a transducer deposited on the trailing end of the slider and having a protective layer formed over a trailing edge surface of the transducer, said transducer having a transducer element aligned relative to the air bearing surface to define an operating surface of the transducer, the protective layer having a lower surface aligned with the operating surface of the transducer;
      a round wear member formed of a diamond-like carbon deposited on the center rail and being tapered from the center rail to an elevated generally flat surface; and
   an actuator assembly to movably support the disc head relative to the at least one data storage disc for operation.

20. The disc head of claim 19 wherein the wear member is frusto-conical-shaped.

21. The disc head of claim 19 wherein a diameter of the wear member is at least as large as an extent between transverse sides of the transducer element.

* * * * *

UNITED STATES PATENT AND TRADEMARK OFFICE
CERTIFICATE OF CORRECTION

PATENT NO.      : 6,377,422 B1
DATED           : April 23, 2002
INVENTOR(S)     : Boutaghou et al.

It is certified that error appears in the above-identified patent and that said Letters Patent is hereby corrected as shown below:

Title page,
Item [56], References Cited, U.S. PATENT DOCUMENTS, please insert
-- 5,473,486     12/1995     Nepela et al. ..........360/103 --

Column 8,
Line 14, after "rail", please insert -- proximate to the trailing end --
Line 18, "edge" should be -- end --

Signed and Sealed this

Twenty-fourth Day of December, 2002

JAMES E. ROGAN
*Director of the United States Patent and Trademark Office*